United States Patent
Nair (10) Patent No.: US 10,433,286 B2
(45) Date of Patent: Oct. 1, 2019

(54) LAYER 2 RELAY TO SUPPORT COVERAGE AND RESOURCE-CONSTRAINED DEVICES IN WIRELESS NETWORKS

(71) Applicant: Alcatel-Lucent USA Inc., Murray Hill, NJ (US)

(72) Inventor: Suresh P. Nair, Whippany, NJ (US)

(73) Assignee: Nokia of America Corporation, Murray Hill, NJ (US)

(*) Notice: Subject to any disclaimer, the term of this patent is extended or adjusted under 35 U.S.C. 154(b) by 51 days.

(21) Appl. No.: 15/647,990

(22) Filed: Jul. 12, 2017

(65) Prior Publication Data

US 2018/0020442 A1    Jan. 18, 2018

Related U.S. Application Data

(60) Provisional application No. 62/362,289, filed on Jul. 14, 2016.

(51) Int. Cl.
*H04W 72/04* (2009.01)
*H04W 12/06* (2009.01)
(Continued)

(52) U.S. Cl.
CPC .......... *H04W 72/0406* (2013.01); *H04B 7/15* (2013.01); *H04L 5/003* (2013.01);
(Continued)

(58) Field of Classification Search
CPC . H04W 72/0406; H04W 76/11; H04W 72/04; H04W 12/06
See application file for complete search history.

(56) References Cited

U.S. PATENT DOCUMENTS

2004/0082330 A1* 4/2004 Marin ................. H04Q 7/20
2011/0134827 A1* 6/2011 Hooli et al.
(Continued)

FOREIGN PATENT DOCUMENTS

EP       2 925 044 A1    9/2015
WO    2015141165 A1    9/2015

OTHER PUBLICATIONS

"3rd Generation Partnership Project; Technical Specification Group Services and System Aspects; Proximity-based services (ProSe); Stage 2 (Release 13)", 3GPP Standard; 3GPP TS 23.303, 3rd Generation Partnership Project (3GPP), Mobile Competence Centre; France, vol. SA WG2, No. V13.4.0, Jun. 22, 2016, pp. 1-124.
(Continued)

*Primary Examiner* — Ronald B Abelson
(74) *Attorney, Agent, or Firm* — Duft & Bornsen, PC (57) ABSTRACT

Embodiments provide a mobile communications device that includes a processor configured to communicate with a transceiver and a memory. The transceiver is configured to exchange control signals with a network node. The memory contains instructions that when executed by the processor configure the processor to operate the transceiver to exchange the control signals. The instructions further configure the processor to pass a first proper subset of the control signals to a remote device without operating according to the control signals, and to operate according to control signals in a second proper subset of the control signals. The processor is thereby configured to operate on behalf of a remote communication device to support communication between the remote communication device and the network node.

18 Claims, 10 Drawing Sheets

(51) Int. Cl.
*H04B 7/15* (2006.01)
*H04L 5/00* (2006.01)
*H04W 76/11* (2018.01)
*H04W 12/04* (2009.01)
*H04B 7/26* (2006.01)
*H04W 88/04* (2009.01)
*H04W 76/14* (2018.01)
*H04W 12/00* (2009.01)

(52) U.S. Cl.
CPC ........... *H04W 12/04* (2013.01); *H04W 12/06* (2013.01); *H04W 72/04* (2013.01); *H04W 76/11* (2018.02); *H04B 7/2606* (2013.01); *H04L 5/005* (2013.01); *H04L 2463/061* (2013.01); *H04W 12/00518* (2019.01); *H04W 76/14* (2018.02); *H04W 88/04* (2013.01)

(56) References Cited

U.S. PATENT DOCUMENTS

| | | | |
|---|---|---|---|
| 2012/0106439 A1* | 5/2012 | Liu | H04W 4/00 |
| 2012/0218101 A1* | 8/2012 | Ford | G06B 1/08 |
| 2013/0016649 A1 | 1/2013 | Damnjanovic et al. | |
| 2013/0195004 A1* | 8/2013 | Hampel | H04L 12/56 |
| 2014/0038582 A1* | 2/2014 | Horneman | H04W 76/02 |
| 2014/0321355 A1 | 10/2014 | Choi | |
| 2015/0230209 A1 | 8/2015 | Jactat et al. | |
| 2016/0156404 A1 | 6/2016 | Wolfner et al. | |
| 2016/0165642 A1* | 6/2016 | Lunden | H04W 76/02 |
| 2016/0212682 A1 | 7/2016 | Chung et al. | |
| 2018/0022359 A1* | 1/2018 | Gusenbauer | B60W 40/08 |

OTHER PUBLICATIONS

Nokia et al: "Issues related to Sidelink Control Layer-1 ID and Layer-2 ID", 3GPP Draft; R2-1703366_FED2D_L1L2IDS_FINAL, 3rd Generation Partnership Project (3GPP), Mobile competence Centre; France, vol. RAN WG2, No. Spokane, USA; Apr. 3, 2017-Apr. 7, 2017, Apr. 3, 2017, Retrieved from the Internet: URL:http://www.3gpp.org/ftp/Meetings_3GPP_SYNC.RAN2/Docs/ [retrieved on Apr. 3, 2017] the whole document.

KPN: "New solution for Service Continuity", 3GPP Draft; S2-172113-PCR_New Solution for Service Continuity, 3rd Generation Partnership Project (3GPP), Mobile Competence Centre, France, vol. SA WG2, No. Busan, South Korea; Mar. 27, 2017-Mar. 31, 2017, Mar. 26, 2017, Retrieved from the Internet: URL:http://www.3gpp.org/ftp/Meetings_3GPP_SYNC/SA2/Docs/ [retrieved on Mar. 26, 2017] the whole document.

PCT International Search Report, PCT/US2017/041895, Intnl Filing Date Jul. 13, 2017, dated Jan. 12, 2018, 5 pages.

Abrardo, et al., Network coding schemes for Device-to-Device communications based relaying for cellular coverage extension, 2015 IEEE 16th International Workshop on Signal Processing Advances in Wireless Communications (SPAWC), Issue Date: Jun. 28-Jul. 1 2015, Stockholm.

* cited by examiner

LAYER 2 RELAY TO SUPPORT COVERAGE AND RESOURCE-CONSTRAINED DEVICES IN WIRELESS NETWORKS

TECHNICAL FIELD

The present invention relates generally to the field of wireless communications, and, more particularly, but not exclusively, to methods and apparatus useful for communications among emergency service providers or public safety personnel.

BACKGROUND

This section introduces aspects that may be helpful to facilitate a better understanding of the inventions. Accordingly, the statements of this section are to be read in this light and are not to be understood as admissions about what is in the prior art or what is not in the prior art. Any techniques or schemes described herein as existing or possible are presented as background for the present invention, but no admission is made thereby that these techniques and schemes were heretofore commercialized, or known to others besides the inventors.

In wireless networks (for example LTE), there are many instances where a particular UE may be out of the coverage area of base station (eNB), may not have the appropriate radio to communicate with the eNB, or may lack sufficient power to establish a direct connection with the eNB, and may thus be considered "remote" to the eNB or the network served by the eNB. In such situations the remote UE may be unable to directly communicate with the eNB. However, there may be another UE in proximity to the remote UE that happens to be within the coverage of the eNB and has appropriate radio resources and power to communicate with the network. Such a scenario may be critical, e.g. for public safety personnel for whom direct wireless coverage may be unavailable in a disaster situation. This scenario may also be encountered for many wireless devices such as "wearables" coming to market, e.g. smart watches and health monitors, which may have limited radio and power resources, but may be able to use another regular UE, such as a smart phone, to establish communication with the network. To provide wireless coverage for such remote UEs which are out of the coverage area, or wearables with limited radio capability, relays are typically used to extend connectivity to these devices.

SUMMARY

The inventor discloses various apparatus and methods that may be beneficially applied to relaying data to and from a communications device, e.g. a UE device, outside of network coverage. While such embodiments may be expected to provide improvements in performance and/or reduction of cost of relative to conventional approaches, no particular result is a requirement of the present invention unless explicitly recited in a particular claim.

One embodiments provides a mobile communications device, e.g. a User Equipment device such as a smart phone or tablet computer. The mobile device includes a processor communicatively coupled to a transceiver and a memory. The transceiver is configured to exchange control signals with a network node, e.g. an eNB. The memory contains instructions that when executed by the processor configure the processor to operate the transceiver to exchange the control signals. The instructions further configure the processor to pass a first proper subset of the control signals to a remote device without operating according to the control signals, and to operate according to control signals in a second proper subset of the control signals. The processor is thereby configured to operate on behalf of a remote communication device to support communication between the remote communication device and the network node.

In some embodiments the processor is further configured by the instructions to support two radio links with the network node, with each radio link being identified by a unique identifier.

In some embodiments the first proper subset includes RRC and PDCP control signals. In some embodiments the second proper subset includes LTE RLC, MAC and PHY control signals.

In some embodiments the instructions further configure the processor to implement an E-UTRAN protocol stack divided between the mobile device and the remote device.

In some embodiments the instructions further configure the processor to direct to the remote device an RRC connection setup message that includes a CRNTI identity of the remote device provided by the network node.

Some embodiments provide a non-transitory computer-readable data storage device comprising instructions that when executed configure the processor according to any of the embodiments described above.

Various embodiments provide methods, e.g. methods of manufacturing a mobile communications device according to any of the embodiments described above.

Another embodiments provides a remote wireless communications device, e.g. a wearable wireless device. The remote device includes a process communicatively coupled to a transceiver and a memory. The transceiver is configured to receive communications protocol control signals via a radio link. The memory contains instructions that when executed configure the processor to receive the protocol control signals from the transceiver. The processor is further configured by the instructions to derive from the control signals first access stratum security credentials that match second access stratum security credentials derived by a network node of a wireless telecommunications network, and to exchange data with a relay communications device via an air interface, the data encoded using the access stratum security credentials.

In various embodiments the processor is further configured by the instructions to operate the transceiver to direct a PC5 authentication response to the relay communications device in response to receiving a PC5 authentication request.

In various embodiments the processor is further configured by the instructions to establish an RRC connection with a network node in response to receiving from the relay communications device an RRC connection setup message that includes a Cell Radio Network Temporary Identifier (CRNTI) assigned by the network node to the remote wireless communications device.

In various embodiments the processor is further configured by the instructions to direct an access stratum (AS) security mode command complete message to the relay communications device via a PC5 radio link in response to receiving an AS security mode command request from the relay communications device via the PC5 radio link.

In various embodiments the processor, memory and transceiver are components of a wearable device.

Various embodiments provide a non-transitory computer-readable data storage device comprising instructions that when executed configure the processor according to any of the preceding embodiments of a remote wireless communications device.

Various embodiments provide methods, e.g. methods of manufacturing a remote wireless communications device according to any of the embodiments described above.

BRIEF DESCRIPTION OF THE DRAWINGS

A more complete understanding of the present invention may be obtained by reference to the following detailed description when taken in conjunction with the accompanying drawings wherein.

DEFINITIONS

In the discussion below, some of the following definitions may apply:
3GPP 3$^{rd}$ Generation Partnership Project
AKA Authentication and Key Agreement
ASME Access Security Management Entity
AS Access Stratum
AV Authentication Vector
CRNTI Cell Radio Network Temporary Identifier
eNB Evolved Node-B
EPC Evolved Packet Core
EPS Evolved Packet System
E-UTRAN Evolved UTRAN
GUTI Globally Unique Temporary Identity
HSS Home Subscriber Server
IMSI International Mobile Subscriber Identity
$K_{ASME}$ Secret key derived from the result of successful AKA authentication protocol run
LTE Long Term Evolution
MAC Medium Access Control
MME Mobility Management Entity
PLMN Public Land Mobile Network
PDCP Packet Data Convergence Protocol
PGW Packet Data Network Gateway
PHY Physical Layer
RLC Radio Link Control
RRC Radio Resource Control
SGW Serving Gateway
TS Technical Standard
UE User Equipment
UTRAN Universal Terrestrial Radio Access Network

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Wearable devices are a new segment of devices which may depend on relays. As used herein and in the claims, "wearable device" refers to a member of a class of electronic devices that can be worn on the body as an accessory or an implant, such as smart watches, fitness devices, so-called fashion electronics, and medical devices such as hearing aids. Such devices may also be regarded as remote user equipment ("remote UE") or "remote devices", and may referred to as such in this discussion. Such devices are often powered by a small battery, and are therefore typically limited in power and radio resources. Such devices may also have a different type of radio interface from a wide-area wireless network, such as WiFi or Bluetooth, which may not be directly compatible with the macro networks, e.g. E-UTRAN. Therefore, a remote UE may use a nearby device such as a smart phone, tablet or laptop computer as a relay UE to establish an "indirect-direct" communication link with a network. When such a relay device is not available in the vicinity, the wearable device may then form a "direct" connection to the network if suitably configured.

Conventional approaches to providing relay services to a remote UE include 1) a relay node (RN) as defined in 3GPP 36.216, incorporated herein by reference, and 2) a Proximity Services (ProSe) UE-to-network relay as described by 3GPP TS 23.303 incorporated herein by reference, including a security solution defined in 3GPP TS 33.303, incorporated herein by reference.

First addressing the relay node, this is typically a low-power base station that provides enhanced coverage and capacity at a cell edge for a remote UE that is out of network coverage. A relay node appears as a regular eNB to a remote UE that is outside direct network coverage. The relay node is connected via a Un radio interface to a special eNB sometimes referred to as a Donor eNB (DeNB). The Un radio interface is a modification of the E-UTRAN Uu air interface. Hence in a donor cell the radio resources are shared between remote UEs served directly by the DeNB and the Relay Nodes. Hence the DeNB provides Uu and Un types of interfaces. The MME is also aware of the nature of the eNB it is connecting to, e.g. whether the eNB is a regular eNB or a DeNB.

Figure 1:
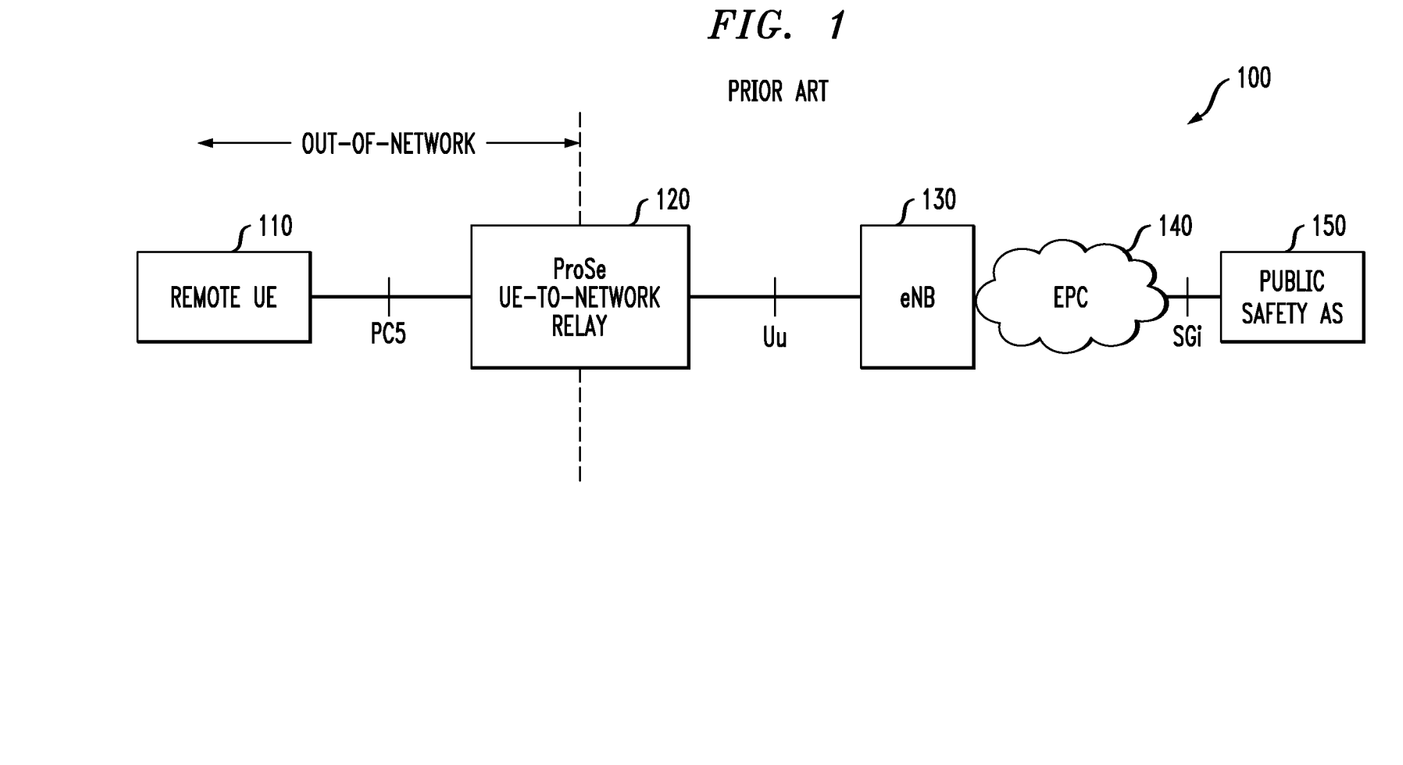
FIG. 1 illustrates a conventional approach to providing network access to a remote (out-of-network) remote device by a relay device.

Considering next the ProSe UE-to-network relay, FIG. 1 illustrates a conventional example of such a system, designated 100, configured to provide network access to a remote UE 110 that is outside network coverage by a relay device 120. In the illustrated conventional approach, the relay device 120 is a ProSe-to-network relay. The remote UE 110 and the relay device 120 communicate via a PC5 interface. The relay device 120 in turn communicates via a Uu interface with an eNB 130, which communicates with the evolved packet core (EPC) 140. Lastly, the EPC 140 communicates with a public safety application server (AS) 150. Aspects of the system 100 are described by 3GPP TS 23.303, TS 33.303, 3GPP 36.216, and 3GPP SP 160231, each of which is incorporated by reference in its entirety. This data relay provided by the system 100 is a ProSe feature-specific scheme, relaying information on the ProSe PC5 interface (sometimes referred to as the "side channel" or "side link") to the LTE Uu interface towards the eNB 130. This relay operates to relay IP traffic via protocol layer 3 over PC5 to the remote UE 110. The network elements eNB 130, and EPC nodes such as the MME, SGW, PGW, etc. (not shown in FIG. 1) recognize only the ProSe UE-to-network Relay, but the remote UE 110 is not directly recognized by these network elements.

These two relay solutions may not be sufficient. In the case of the relay node described first above the relay is not really behaving as a relay to carry any communication packet, but is instead replicating the air interface and behaving as a normal eNB as any UE would normally see. Hence the relay node (RN) behaves as a normal eNB to the remote UE, but behaves differently to other eNBs since it is not a real UE. Hence the relay node can only connect to a donor eNB. Furthermore, the MME (not shown) also needs to know whether the relay node is attached to a regular eNB or a Donor eNB. This makes the relay node complicated to implement and difficult to deploy. In the case of the ProSe relay discussed second above, the solution is specific to ProSe applications, in which layer-3 IP packets are terminated at the ProSe relay device 120. Thus, from the viewpoint of the network elements eNB, MME, SGW, PGW, etc., the relay device 120 is the termination point for IP packets, not the remote UE 110. This compromises the confidentiality of the remote UE 110, because all the data and signaling that is passing through the relay device 120 can be seen by it.

Embodiments described below are expected to address deficiencies in such conventional approaches by, e.g., relaying data to and from a remote mobile device, e.g. a remote UE or wearable device, via a layer-2 radio level interface. Such embodiments are expected to provide secure communications between a network node and the remote mobile device. In particular, various embodiments support such communication while preventing the relay device from decoding or deciphering the relayed data. Thus the security of the data is enhanced relative to conventional approaches.

Figure 2:
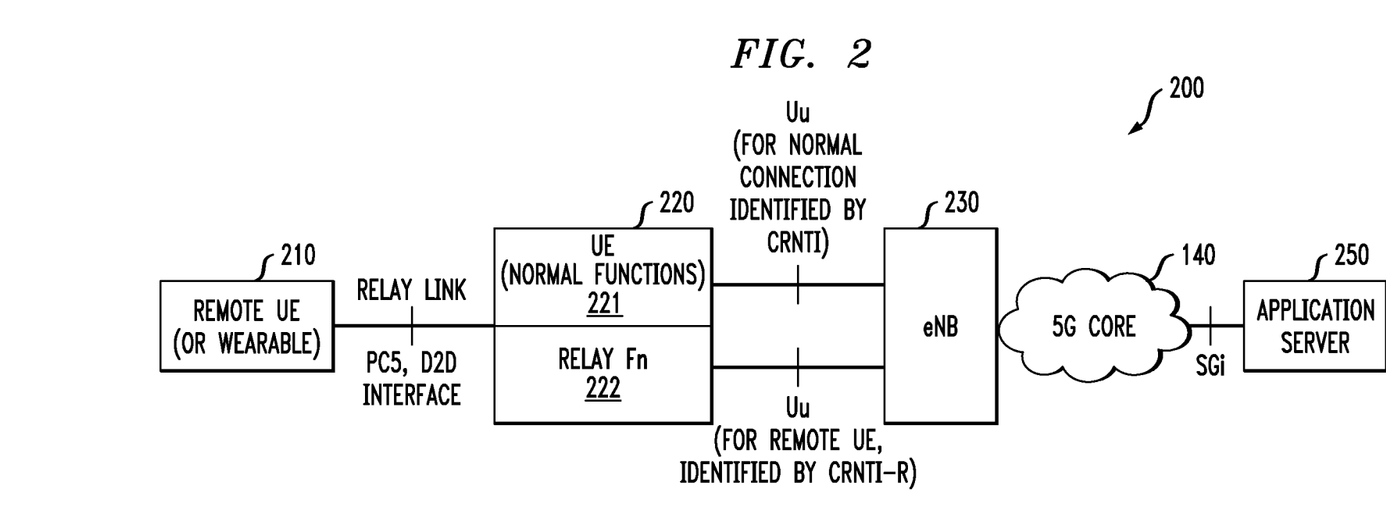
FIG. 2 illustrates an embodiment including a relay device and eNB configured to communicate via two radio links to provide service to a remote device.

FIG. 2 illustrates an embodiment, e.g. a system 200, that implements a relay link between a remote communication device 210 and a relay device 220, e.g. a relay UE. The remote device 210 may be, e.g., another UE or a wearable device. The relay device 220 is configured to provide two operating modes to communicate with a network node 230, e.g. an eNB, and the network node 230 is in turn configured to cooperate with the relay device 220 to support those modes of operation. A first function set 221 of the relay device 220 provides "normal" functionality. For example, if the relay device 220 is a smart phone, the function set 221 provides the functions needed to communicate with the network node 230 via a first Uu interface to implement operation typically associated with smart phone functionality, e.g. send and receive phone calls and text messages, and connect with the internet. The relay device 220 also includes a second set 222 of functions, referred to as "relay functions". The function set 222 provides the necessary functions to support establishing and maintaining a relay connection with the remote device 210, and to communicate with the network node 230 via a second Uu interface to pass the relay data between the remote device 210 and the network node 230. The system 200 is also shown including an AS 250 that may provide more general services to any type of devices, such as wearables, in addition to or alternatively to the public safety AS 150 of FIG. 1.

In an example embodiment, the relay device 220 may be a smart phone, and the remote device 210 may be a wearable device, which may be out of network coverage or lacking an appropriate radio. The remote device 210 may request over the side link PC5 to establish communication to the network. The relay device 220 has a preexisting Uu air interface connection with the network node 230 using the normal functions 221, using a CRNTI identifier. The relay device 220 requests the network node 230 to provide a second air interface connection reserved for the remote device 210. The network node 230 assigns a new identifier, e.g. CRNTI-R, for the reserved connection to the remote device. Hence the network node 230 is made aware that the relay device 220 has two Uu air interface connections with the relay device 220, one for communicating with the relay device 220 and another for communicating with the remote device 210. The relay device 220 is configured to support two or more air interface connections simultaneously either by including two or more modems, or by being configured to support two streams of data, each data stream being associated with a different CRNTI (e.g. CRNTI and CRNTI-R) and being directed to the relay device 220 or the remote device 210. For example, such functions may provide the relay device 220 with the capability to map the Uu interface data based on the CRNTI and CRNTI-R, thereby signaling to itself or to the remote device 210 connected on the PC5 side link. While only a single remote device 210 is explicitly shown in FIG. 2, this scheme may be extended to support multiple remote devices, each being assigned its own unique CRNTI-R.

In some embodiments, the relay device 220 and one or more remote devices may be serviced by the network node 230 via a single Uu air interface. In such embodiments (not explicitly shown n FIG. 2.), each entity supported via the air interface via the network node 230 may be identified by its unique identifier, e.g. the CRNTI (or CRNTI-R) assigned to that entity. In such embodiments the network node 230 may be configured to extract, e.g. demultiplex, data received by the relay device 220, and combine, e.g. multiplex, data directed from the relay device 220, using an adaption layer to map data from the single air interface to and from a data stream mapped to each of the relay device and one or more remote devices. Those skilled in the art are familiar with adaptation layers, and are able to fashion a suitable adaptation layer for such embodiments without undue experimentation.

Figure 3:
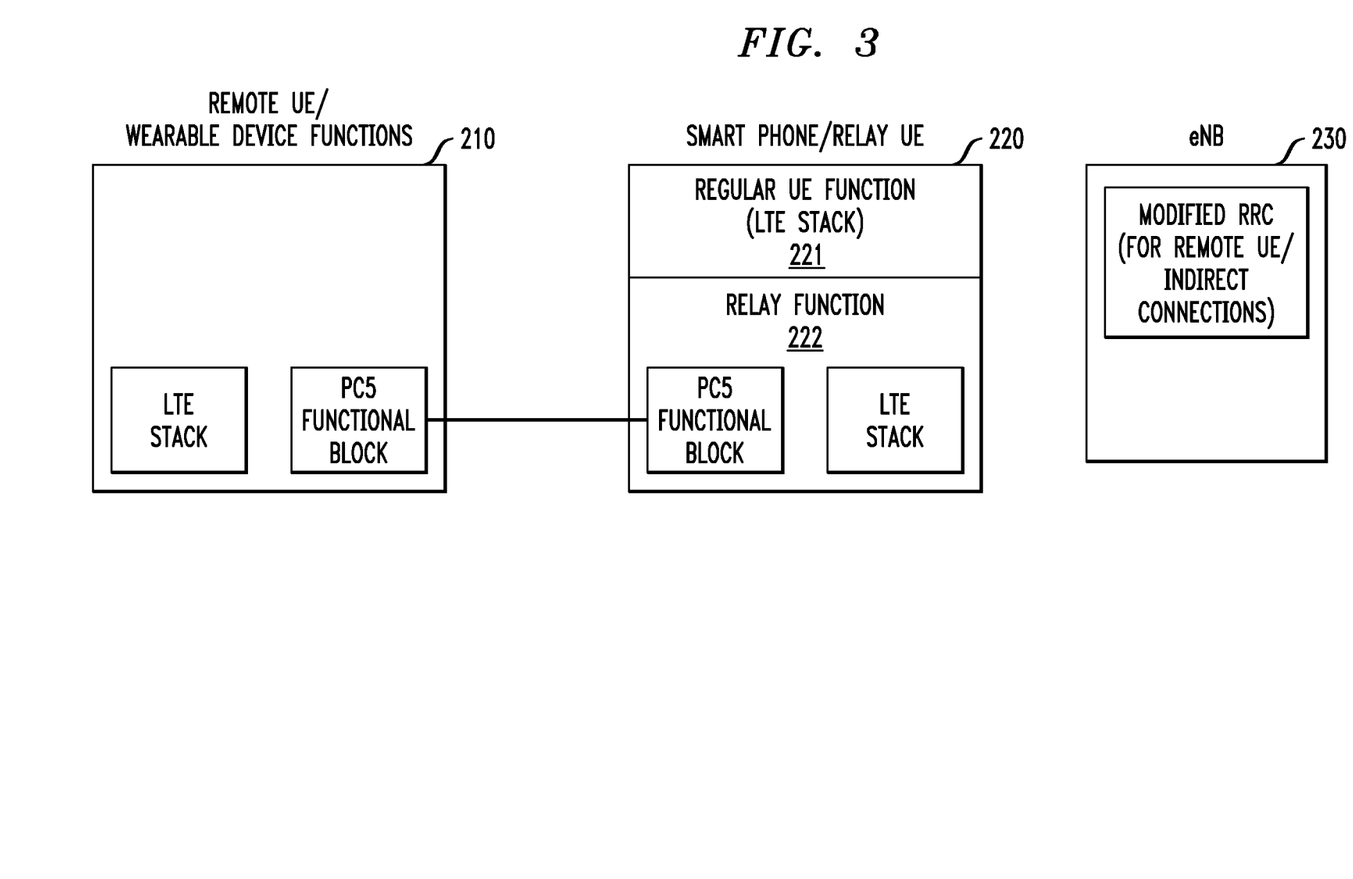
FIG. 3 illustrates an embodiment showing additional details of the configuration of FIG. 2, including a PC5, or side channel, connection between the remote device and the relay device, and a remote radio control (RRC) in the eNB modified to support the communication link between the remote device and the relay device.

FIG. 3 illustrates a view of the remote device 210, relay device 220 and network node 230, focusing on the communication between the remote device 210 and relay device 220 via the PC5 air interface. While the PC5 interface is shown, in other embodiments the air interface may be provided by another suitable radio link, e.g. LTE, WiFi, Bluetooth, or any other suitable technology. The relay device 220 is assumed to support an LTE radio stack. Each of the remote device 210 and the relay device 220 includes a PC5 functional block that includes the program steps needed to implement the PC5 air interface. Such steps are included in the embodiments of methods 500 and 600, described below. The network node 230 includes nonconventional RRC functions to support the assignment of multiple CRNTIs to communications with the relay device 220 as described in greater detail below.

Figure 4:
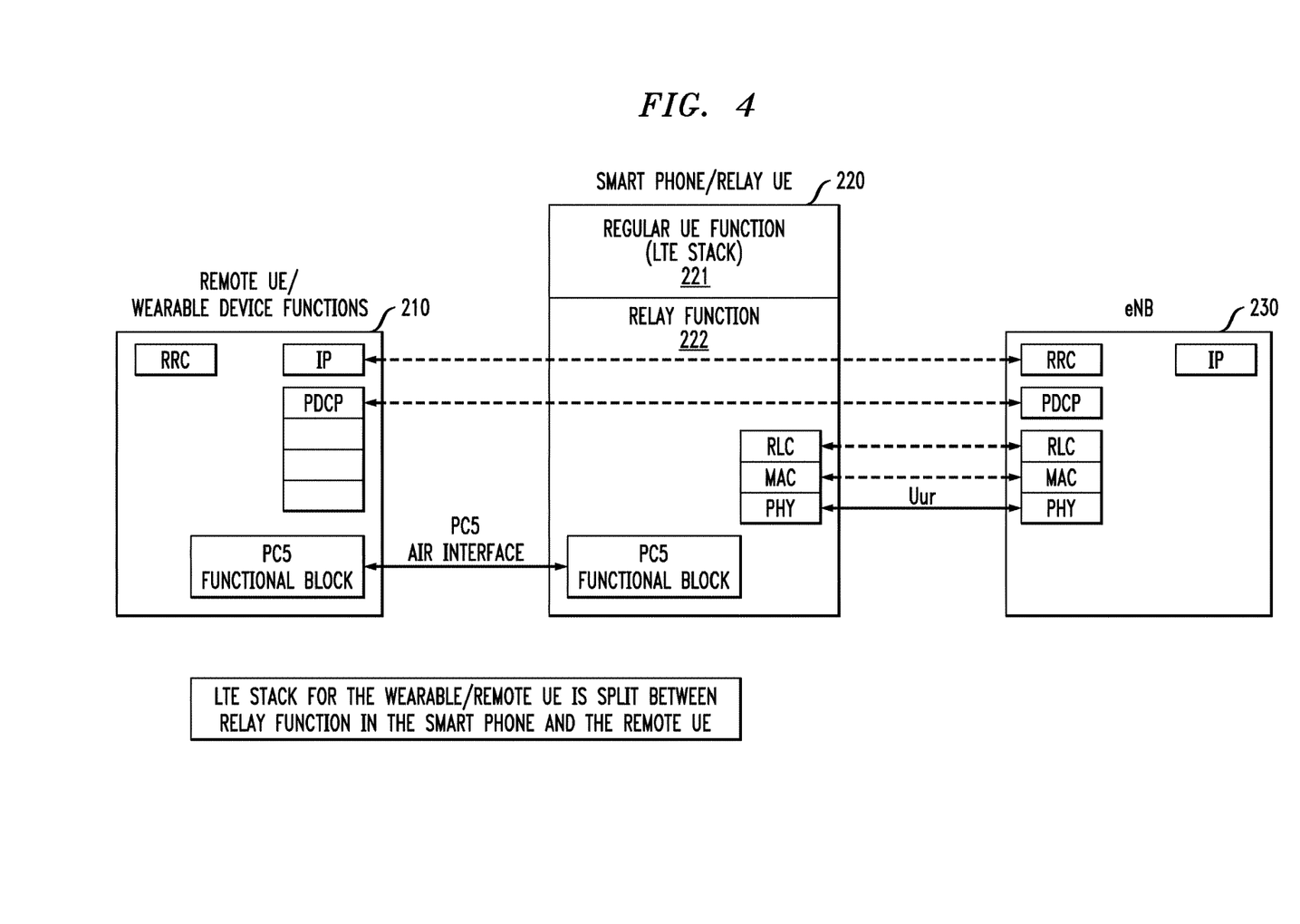
FIG. 4 illustrates additional details, e.g. of an LTE stack, in the remote device, relay device and the eNB of FIG. 2, when configured according to various embodiments.

FIG. 4 illustrates a view of the remote device 210, relay device 220 and network node 230, showing an expanded view of various LTE E-UTRAN parameters exchanged between these entities, according to various embodiments. Those skilled in the pertinent art will appreciate that an E-UTRAN protocol stack includes RRC (radio resources control), PDCP (packet data convergence protocol), RLC (radio link control), MAC (media access control) and PHY (physical) layers, the last (PHY) layer being referred to as the LTE Uu air link, or LTE radio interface. In the illustrated embodiment, the network node 230 includes the various functional blocks that are used in the Uu air link, e.g. RRC, PDCP, RLC, MAC and PHY. In this manner, the relay device 220 may act on behalf of the remote device 210 with respect to these functional blocks when the remote device is unable to communicate directly with the network node 230, while allowing the remote device 210 to maintain control over those functions needed to maintain privacy of the communications between the remote device 210 and the network node 230. In other embodiments that implement a different side link air interface, e.g. WiFi or Bluetooth, different protocol layers may be used. Those skilled in the pertinent art are familiar with such interfaces and related protocol layers, and are able implement such alternative embodiments without undue experimentation.

In a conventional Uu air link, each of these blocks would be matched by a complementary function implemented by the relay device 220. However, in the illustrated embodiment, only a first proper subset, the RLC, MAC and PHY blocks are matched by complementary functional blocks in the relay device 220, while a second proper subset, the RRC and PDCP blocks, are matched by complementary blocks in the remote device 210. (The reader will appreciate that a proper subset includes some, but not all, of the members of the set of which it is a part.) The PDCP block provides ciphering and integrity protection, and the proper CRNTI is needed to identify the data. With the independent identification of the remote device, separate from the relay device 220, derivation of complete EPS key hierarchy $K_{eNB}$, $K_{RRCint}$, $K_{RRCenc}$, $K_{UPenc}$ and $K_{UPint}$ described in clause 6.2 of 3GPP TS 33.401c clause 6.2 becomes possible. 3GPP TS 33.401 is incorporated herein in its entirety. Using these keys the signaling messages between remote device 210 and network node 230 can be integrity protected and user data can be encrypted. In particular, the relay device 220 derives its own AS security keys that match its AS security keys separately derived by the network node 230. As a result, the relay device 220 is not able to decode or decipher the data directed by the remote device 210 to the network node 230, or from the network node 230 to the remote device 210, and only the remote device 210 and network node 230 possess the credentials to do so. The CRNTI and the CRNTI-R parameters used in the messages exchanged between the network node 230 and relay device 220 will indicate whether the messages are meant for the relay device 220 or remote device 210 and map the messages to the appropriate receiver relay device 220 or remote device 210 via the PC5 interface. The receiving entity will further map the received messages to its protocol stack e.g. PDCP block and PDCP context parameters to identify the radio bearer established and decode the message to the correct incoming stream.

Therefore the relay device 220 may act as a relay between the network node 230 and the remote device 210, which may be beyond network coverage or lacking appropriate radio resources, without the relay device 220 being able to decode or otherwise interpret the data that is being relayed. Thus the security of the data being relayed is enhanced relative to conventional approaches to relaying data between the network and a remote device.

Figure 5:
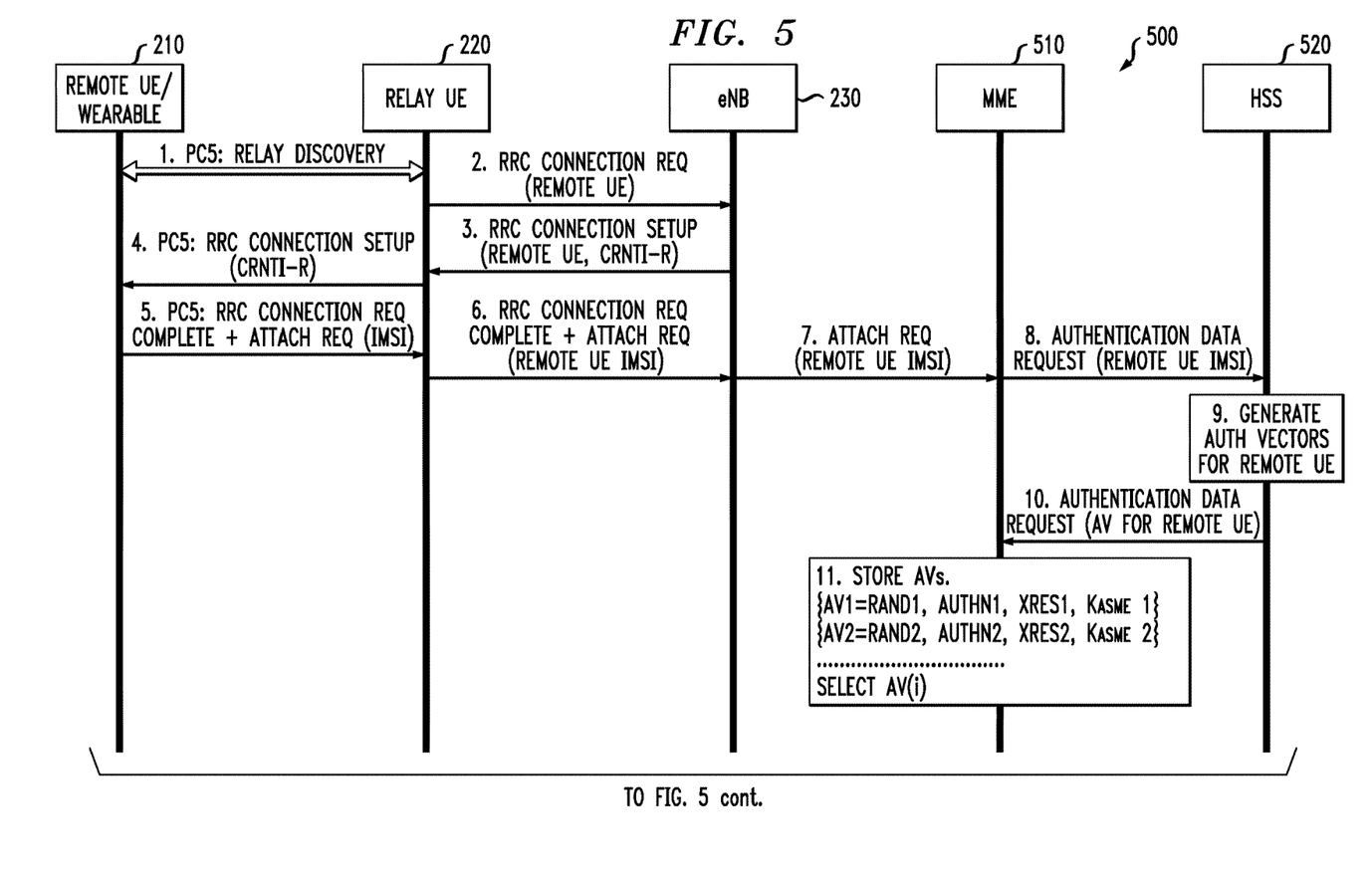
FIG. 5 illustrates a method, e.g. a call flow, for initial remote device attach and authentication according to one embodiment.

FIG. 5 illustrates a method 500, e.g. an embodiment that implements initial attach and authentication of a remote UE, e.g. the remote device 210 of FIG. 2. FIG. 5 includes signaling between the remote device 210, the relay device 220 and the network node 230, as well as an MME 510 and HSS 520, not explicitly shown in FIG. 2. In the following description of FIG. 5, the steps are enumerated as Steps 1 through 19.

Step 1: The remote device 210 discovers the relay device 220 for relay operation over PC5 (defined in Rel 13) and requests to make a connection to an eNB of the given PLMNid, e.g. the network node 230.

Step 2: The relay device 220 makes a RRC Connection Request on behalf of the remote device 210. There are two cases, a) the relay device 220 and the remote device 210 belong to same PLMN, with the relay device 220 already connected to the network, and b) the relay device 220 belongs to a different PLMN and is not yet connected to network. In the first case, the relay device 220 makes a direct 'RRC Connection Request' to the network node 230 it is connected to. In the second case, the relay device 220 executes a random access procedure, and receives on behalf of the remote device 210 a CRNTI-R for connection by the remote device 210 to the PLMN. The CRNTI of the remote device 210 is referred to herein as CRNTI-R. The relay device 220 then makes the 'RRC Connection Request'. In both cases the network node 230 recognizes that the connection is an indirect connection with the remote device 210 through the relay device 220.

Step 3: The network node 230 returns an 'RRC Connection Setup' message and assigns the CRNT-R to identify the indirect connection.

Step 4: The relay device 220 forwards 'RRC Connection Setup' from the network node 230 to the remote device 210 over PC5. Hereafter the relay device 220 will maintain a separate connection with the network node 230 identified by the CRNTI-R allocated for the remote device 210. The relay device 220 may also maintain a simultaneous separate connection with the network node 230 identified by a CRNTI allocated to the relay device 220. The relay device 220 may operate as a relay for multiple remote devices based on the resource capability of the radio layer of the relay device 220. In such cases, each remote device will be identified by a separate CRNTI-R allocated by the network node 230.

Step 5: The remote device 210 responds with 'RRC Connection Request Complete', message may contain a piggy-backed Attach Request. The message will indicate the CRNTI-R allocated to the remote device 210. The Attach Request will contain the IMSI of the remote device 210 and the UE capability of the remote device 210, as is done for a normal direct connection by a conventional UE.

Step 6: The relay device 220 forwards 'RRC Connection Request Complete+Attach Request' from the remote device 210 to the network node 230 using the CRNTI-R allocated for remote device 210.

Step 7: The network node 230 forwards the attach request message from the remote device 210 to the MME 510 for Authentication of remote device 210 and initial attach. 'Attach Request' will contain the IMSI if the remote device 210 as for conventional attach requests.

Step 8: The MME 510 initiates Authentication of remote device 210, by sending 'Authentication Data Request' to the HSS 520. This message also includes the IMSI of the remote device 210.

Step 9: The HSS 520 generates authentication vectors (AVs) for the remote device 210 identified by the IMSI.

Step 10: The HSS 520 responds to the MME 510 with Authentication Vectors for the remote device 210.

Step 11: The MME 510 stores the Authentication vectors received from the HSS 520. The MME 520 selects a particular Vector AV[i] for the authentication for the current instance.

Step 12: The MME 510 directs to the network node 230 an Authentication Request with {RANDi, AUTNi} as parameters of the message.

Step 13: The network node 230 forwards the Authentication Request with {RANDi, AUTNi} using the CRNTI-R allocated for the remote device 210. The relay device 220 receives this message since the CRNTI-R is mapped to it because of the relay function performed by the relay device 220.

Step 14: The relay device 220 forwards the Authentication Request message to the remote device 210 via the PC5 side link.

Step 15: The remote device 210 derives RES, AUTN, non-access stratum (NAS) integrity key IK, and NAS ciphering key CK from the received parameters RANDi and AUTNi. The remote device also calculates $K_{ASME}$ based on the received RANDi, AUTNi.

Step 16: The remote device 210 responds via the PC5 interface with a 'User Authentication Response' message that includes a response value RES in the event that the AUTN verification is successful.

Step 17: The relay device 220 forwards RES to the network node 230 via the Uu interface identified by the CRNTI-R allocated for the remote device 210.

Step 18: The network node 230 forwards RES to the MME 510.

Step 19: The MME 510 authenticates the remote device 210 on the condition that the RES sent by the remote device 210 is equal to an expected response value XRES. The MME 510 begins a NAS context for the remote device 210 and assigns an identified GUTI (Globally Unique Temporary ID). NAS keys {Knas-enc, Knas-int} are setup in the MME 510 and the remote device 210 for protecting NAS messages. Further keys (KeNB) are derived based on $K_{ASME}$.

Figure 6:
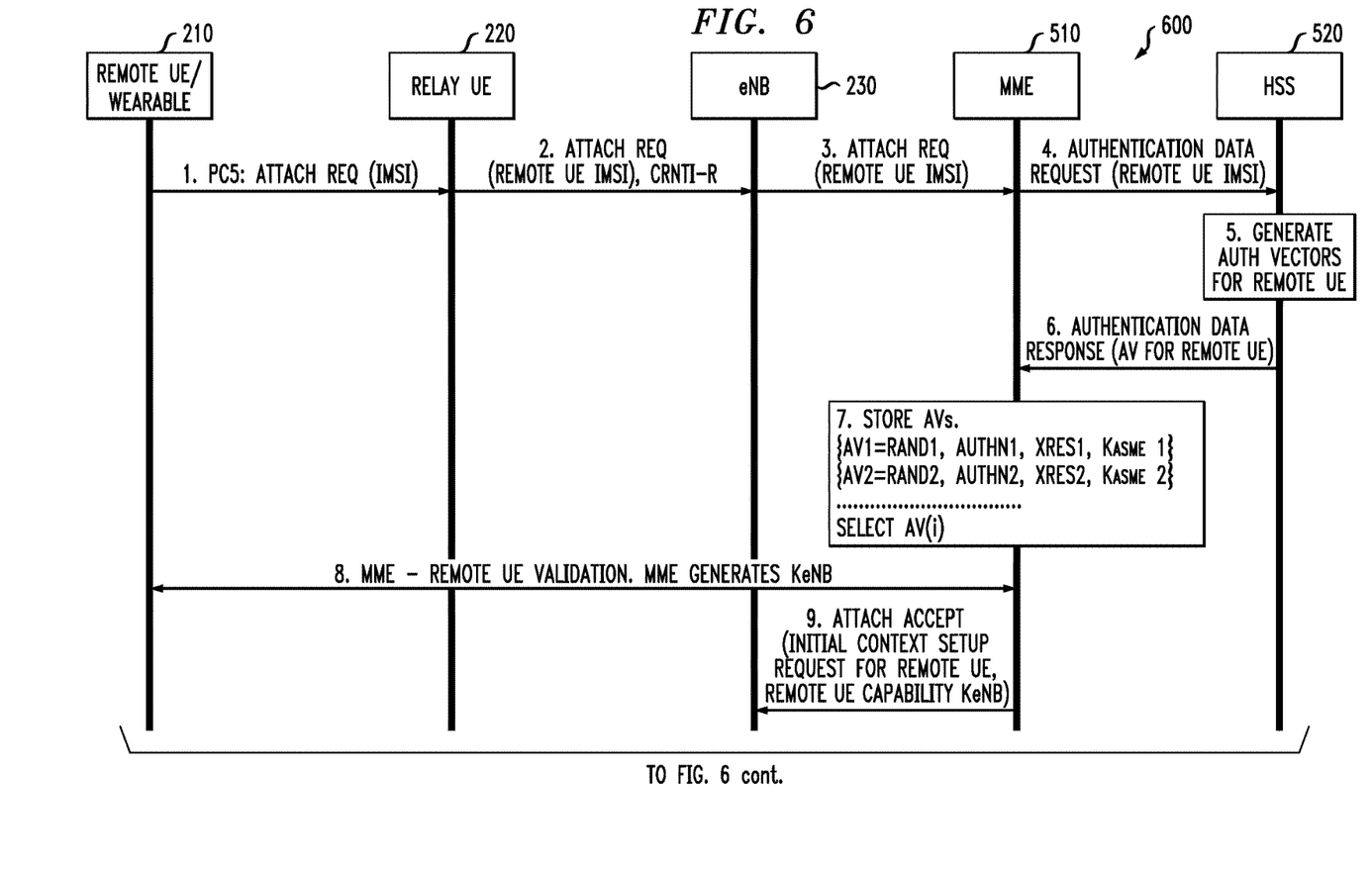
FIG. 6 illustrates a method, e.g. a call flow, for remote UE Access Stratum (AS) Security establishment between the remote device and the relay device, according to one embodiment.

Turning now to FIG. 6, a method 600 is illustrated, e.g. an embodiment that establishes UE Access Stratum (AS) Security for a remote device, e.g. the remote device 210, while accessing over a relay device, e.g. the relay device 220. FIG. 6 includes signaling between the same entities as shown in FIG. 5. In the following description, the steps are enumerated as Steps 1 through 15. Some of the procedures described with respect to FIG. 6 may be adapted from portions of 3GPP TS 24.301, which is incorporated by reference in its entirety.

Step 1: The remote device 210 directs an Attach Request message via the PC5 link to the relay device 220. The message includes an identifier of the remote device 210, e.g. an IMSI.

Step 2: The relay device 220 directs a second Attach Request message to the network node 230 on behalf of the remote device 210. This Attach Request message includes the identifier, e.g. IMSI, of the remote device 210, and an alternate identifier of the remote device 210, e.g. the CRNTI-R previously allocated to the remote device 210 by the network node 230 based on the IMSI of the remote device 210. The receipt of the CRNTI-R alerts the network node 230 to the presence of the remote device 210 so that the network node 230 may operate appropriately, e.g. encoding data directed to the remote device 210 using the CRNTI-R assigned to the remote device 210 instead of the CRNTI assigned to the relay node 220.

Step 3: The network node 230 directs a third Attach Request message to the MME 510 on behalf of the remote device 210. This message includes the IMSI of the remote device 210, but not the CRNTI-R.

Step 4: The MME 510 directs an Authentication Data Request message to the HSS 520 requesting authentication data for the remote device 210. This message includes the IMSI of the remote device 210.

Step 5: The HSS 520 generates the authentication data, e.g. an authentication vector, corresponding to the requesting remote device 210. The vector may include a random number RAND, an authentication key AUTN, an expected response XRES, and a $K_{ASME}$. This authentication vector, represented as $AV_n$, is specific to the particular remote device 210 that is requesting attachment, and may thus be subscripted to denote each of multiple remote devices that the MME 510 may serve, e.g. $AV_1$, $AV_2$, ... depending on the number of remote devices being supported.

Step 6: The HSS 520 directs the AV to the MME 510 in an Authentication Data Response message.

Step 7: The MME 510 stores the AV received from the MME 510. Because the MME may serve multiple remote devices, the MME 510 may store a table of vectors, $AV_1$, $AV_2$ . . . with each vector component similarly indexed, e.g. $RAND_1$, $RAND_2$ . . . .

Step 8: The MME 510 validates the UE 210 and generates $K_{eNB}$.

Step 9: The MME 510 directs to the network node 230 an Attach Accept message for initial context setup of the remote device 210 in the network node 230, corresponding to the Attach Request message the network node 230 received from the UE 210 in Step 2. The message includes operating capability of the UE 210 and the $K_{eNB}$, which is typically part of the subscription data received by the MME 510 from HSS 520 for the remote device 210.

Step 10: The network node 230 identifies the remote device 210 from the validation credentials and initiates a UE context. The network node 230 further selects security integrity and encryption algorithms for the remote device 210, based on the UE capability information received from the MME 510. The network node 230 derives security keys $K_{upenc}$ (user-plane encryption key), $K_{upint}$ (user-plane integrity key), $K_{RRCenc}$ (RRC encryption key), and $K_{RRCint}$ (RRC integrity key) for the remote device 210 based on the $K_{eNB}$ received from the MME 510 in Step 9.

Step 11: The network node 230 directs an AS Security Mode Command toward the remote relay device 220 to initiate security at the remote device 210 and establish the access stratum (AS). The message includes a ciphering algorithm and an integrity algorithm selected by the network node 230 consistent with the capability of the remote device 210. For integrity protection of the message the network node 230 calculates a MAC-I (message authentication code-integrity) and includes this parameter with the message. The network node 230 sends this message using the CRNTI-R.

Step 12: The relay device 220 receives the security mode command, including the CRNTI-R. The relay device 220 then forwards the security mode command towards the remote device 210 using a PC5 interface side link channel Thus the relay device 220 behaves as a transparent layer-2 pipe on behalf of the remote device 210.

Step 13: Upon receiving the security mode command, the remote device 210 uses the $K_{eNB}$ (calculated during the NAS procedure at Step 9) and derives the additional AS keys $K_{upenc}$, $K_{upint}$, $KRRC_{enc}$ and $KRRC_{int}$. The remote device 210 then calculates XMAC-I to verify the integrity code MAC-I.

Step 14: On the condition that MAC-I is successfully verified, the remote device 210 responds via the PC5 link to the relay device 220 with a verification message (AS Security Mode Complete). The message also includes the verified MAC-I.

Step 15: The relay device 220 directs the verification message received from the remote device 210 in Step 14 to the network node 230 using the CRNTI-R allocated to the remote device 210.

When Step 15 is complete, the remote device 210, relay device 220 and network node 230 are configured such that the remote device 210 and the network node 230 may communicate via the relay device 220. However, because the communication between the remote device 210 and the network node 230 is secured based on the CRNTI-R, the relay device 210 is unable to decode the communication, and the communication take place securely.

Embodiments within the scope of this application provide significant new and beneficial functionality to conventional 3GPP standards by, e.g. providing a technically simple way to implement a layer 2 relay instead of a layer 3 relay. A layer 2 relay solution is expected to be of great interest and benefit to the Public Safety community and also IOT (internet of things) devices and wearables.

The new layer 2 relay solution helps to identify the remote UE uniquely, hence this helps in at least these areas: 1) providing security and confidentiality to remote UE while connecting over any relay; 2) because the remote UE is identified, accounting can be provided precisely for the remote UE for all the resources used by it; and 3) during mobility events session continuity can be provided when the remote UE moves from indirect connection to direct connection and vice-versa.

Figure 7:
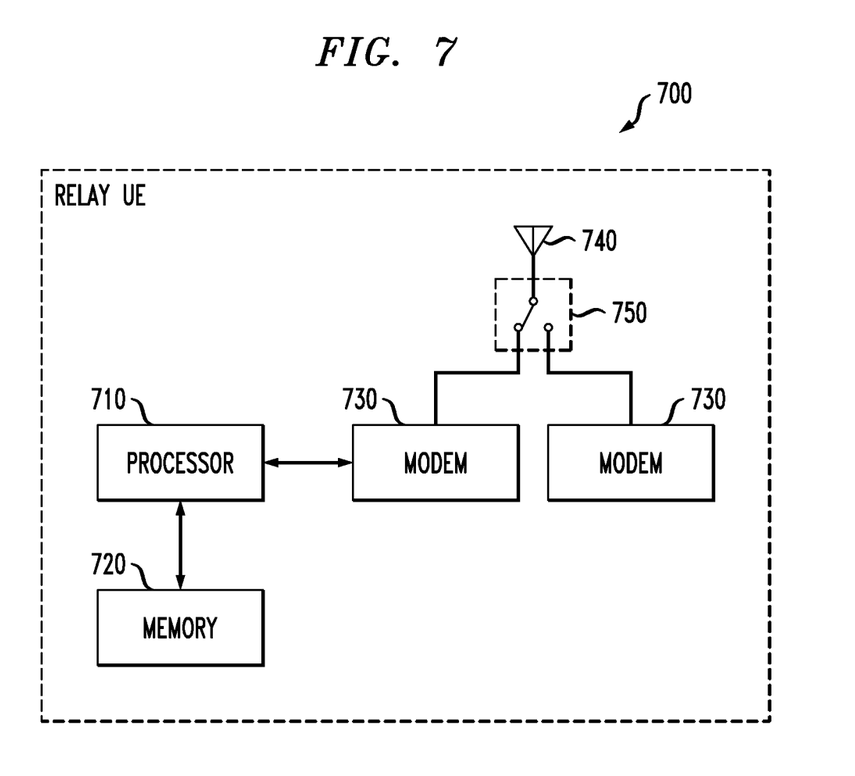
FIG. 7 illustrates a block diagram of a UE suitable for operating as the relay device in the methods of FIGS. 5 and 6.

FIG. 7 illustrates a block diagram of a relay device 700, such as may implement the remote device relay device 220 in various embodiments. A processor 710 is configured to communicate with a non-transitory memory 720 and a transmitter 730. The processor 710 is configured to read from the memory 720 program instructions that when executed by the processor 710 configure the processor 710 to implement a method according to various embodiments described herein, e.g. one of the method 500 or 600 as viewed from the relay device 220. The processor 710 is further configured to cooperate with one or more modems 730 to communicate via an antenna 740 any of the various messages shown in the methods 500 or 600 as being received by or sourced from the relay UE 210 or the remote relay device 220, as appropriate. In embodiments in which multiple modems 730 are used, a switch 740 may be controlled by the processor 710 to connect the proper modem 730 to the antenna 740.

Figure 8:
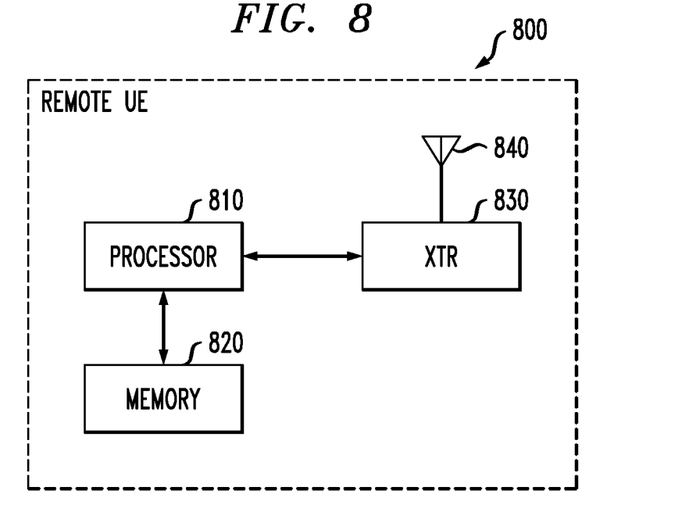
FIG. 8 illustrates a block diagram of a UE suitable for operating as the remote device UE in the methods of FIGS. 5 and 6.

FIG. 8 illustrates a block diagram of a relay device 800, such as may implement the remote device 210 and the relay device 220 in various embodiments. A processor 810 is configured to communicate with a non-transitory memory 820 and a transmitter 830. The processor 810 is configured to read from the memory 820 program instructions that when executed by the processor 810 configure the processor 810 to implement a method according to various embodiments described herein, e.g. one of the method 500 or 600 as viewed from the remote device 210 or the relay device 220. The processor 810 is further configured to cooperate with a transmitter 830 to transmit via an antenna 840 any of the various messages shown in the methods 500 or 600 as being received by or sourced from the relay UE 210 or the remote relay device 220, as appropriate.

Figure 9:
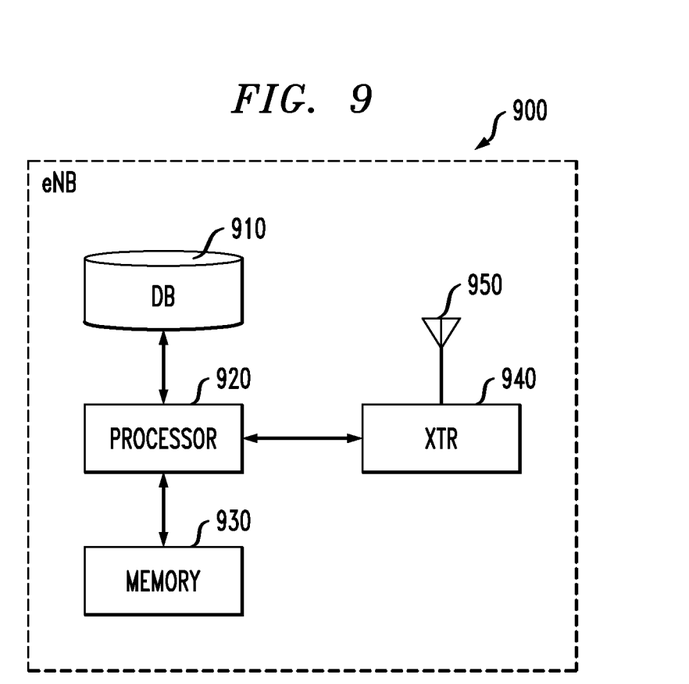
FIG. 9 illustrates a block diagram of an eNB suitable for operating as the eNB in the methods of FIGS. 5 and 6.

FIG. 9 illustrates a block diagram of an eNB device 900, such as may implement the network node 230 in various embodiments. A processor 910 is configured to communicate with a non-transitory memory 920, a database 930 and a transmitter 940. The processor 910 is configured to read from the memory 920 program instructions that when executed by the processor 910 configure the processor 910 to implement a method according to various embodiments described herein, e.g. one of the method 500 or 600 as viewed from the network node 230. The processor 910 is further configured to cooperate with the database 930 to store parameters that allow the processor 910 to communicate with one or more instances of the remote device 210 to implement one or more of the methods 500/600. The processor 910 is still further configured to cooperate with a transmitter 940 to transmit via an antenna 950 any of the various messages shown in the methods 500 or 600 as being received by or sourced from the network node 230.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc. . . . , imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A mobile communications relay device, comprising:
a transceiver configured to exchange control signals with a network node;
a processor; and
a memory coupled to said processor and containing instructions that configure the processor to operate the transceiver to exchange said control signals,
wherein said instructions further configure the processor to pass a first proper subset of said control signals to a remote device without operating according to said control signals, and to operate according to control signals in a second proper subset of said control signals that is distinct from the first proper subset thereby operating on behalf of said remote device to support communication between said remote device and said network node;
wherein said first proper subset includes RRC and PDCP control signals from an E-UTRAN protocol stack;
wherein said second proper subset includes RLC, MAC, and PHY control signals from the E-UTRAN protocol stack.

2. The device as recited in claim 1, wherein said processor is further configured by said instructions to support two or more radio links with said network node, each radio link being identified by a unique identifier.

3. The device as recited in claim 1, wherein said instructions further configure said processor to implement the E-UTRAN protocol stack divided between said relay device and said remote device, wherein any Layer-3 protocols of the E-UTRAN protocol stack are implemented in said remote device for communications directed to said remote device.

4. The device as recited in claim 1, wherein said instructions further configure said processor to direct to said remote device an RRC connection setup message that includes a CRNTI identity of said remote device provided by said network node.

5. A non-transitory computer-readable data storage device comprising instructions that when executed configure the processor according to claim 1.

6. A method, comprising:
configuring a transceiver of a mobile communications relay device to receive control signals from a network node; and
configuring a processor of the relay device to pass a first proper subset of said control signals to a remote device without operating according to said control signals, and to operate according to control signals in a second proper subset of said control signals that is distinct from the first proper subset, thereby operating on behalf of said remote device to support communication between said remote device and said network node;
wherein said first proper subset includes RRC and PDCP control signals from an E-UTRAN protocol stack;
wherein said second proper subset includes RLC, MAC, and PHY control signals from the E-UTRAN protocol stack.

7. The method as recited in claim 6, further comprising configuring said processor to implement two or more radio links with said network node, each radio link being identified by a unique identifier.

8. The method as recited in claim 6, further comprising configuring said processor to implement the E-UTRAN protocol stack divided between said relay device and said remote device, wherein any Layer-3 protocols of the E-UTRAN protocol stack are implemented in said remote device for communications directed to said remote device.

9. The method as recited in claim 6, further comprising configuring said processor to direct to said remote device an RRC connection setup message that includes a CRNTI identity of said remote device.

10. A mobile communications relay device, comprising:
a transceiver configured to exchange control signals with a network node;
a processor; and
a memory coupled to said processor and containing instructions that configure the processor to operate the transceiver to exchange said control signals,
wherein said instructions further configure the processor to pass a first proper subset of said control signals to a remote device without operating according to said control signals, and to operate according to control signals in a second proper subset of said control signals that is distinct from the first proper subset thereby operating on behalf of said remote device to support communication between said remote device and said network node;
wherein said instructions further configure said processor to implement an E-UTRAN protocol stack divided between said relay device and said remote device, wherein any Layer-3 protocols of the E-UTRAN protocol stack are implemented in said remote device for communications directed to said remote device.

11. The device as recited in claim 10, wherein said processor is further configured by said instructions to support two or more radio links with said network node, each radio link being identified by a unique identifier.

12. The device as recited in claim 10, wherein:
said first proper subset includes RRC and PDCP control signals from the E-UTRAN protocol stack; and
said second proper subset includes RLC, MAC, and PHY control signals from the E-UTRAN protocol stack.

13. The device as recited in claim 10, wherein said instructions further configure said processor to direct to said remote device an RRC connection setup message that includes a CRNTI identity of said remote device provided by said network node.

14. A non-transitory computer-readable data storage device comprising instructions that when executed configure the processor according to claim 10.

15. A method, comprising:
configuring a transceiver of a mobile communications relay device to receive control signals from a network node;
configuring a processor of the relay device to pass a first proper subset of said control signals to a remote device without operating according to said control signals, and to operate according to control signals in a second proper subset of said control signals that is distinct from the first proper subset, thereby operating on behalf of said remote device to support communication between said remote device and said network node; and
configuring said processor to implement an E-UTRAN protocol stack divided between said relay device and said remote device, wherein any Layer-3 protocols of the E-UTRAN protocol stack are implemented in said remote device for communications directed to said remote device.

16. The method as recited in claim 15, further comprising configuring said processor to implement two or more radio links with said network node, each radio link being identified by a unique identifier.

17. The method as recited in claim 15, wherein:
said first proper subset includes RRC and PDCP control signals from the E-UTRAN protocol stack; and
said second proper subset includes RLC, MAC, and PHY control signals from the E-UTRAN protocol stack.

18. The method as recited in claim 15, further comprising configuring said processor to direct to said remote device an RRC connection setup message that includes a CRNTI identity of said remote device.

* * * * *